May 8, 1962  R. L. DEGA  3,034,043
SEAL LIP INSTRUMENTATION
Filed May 18, 1959
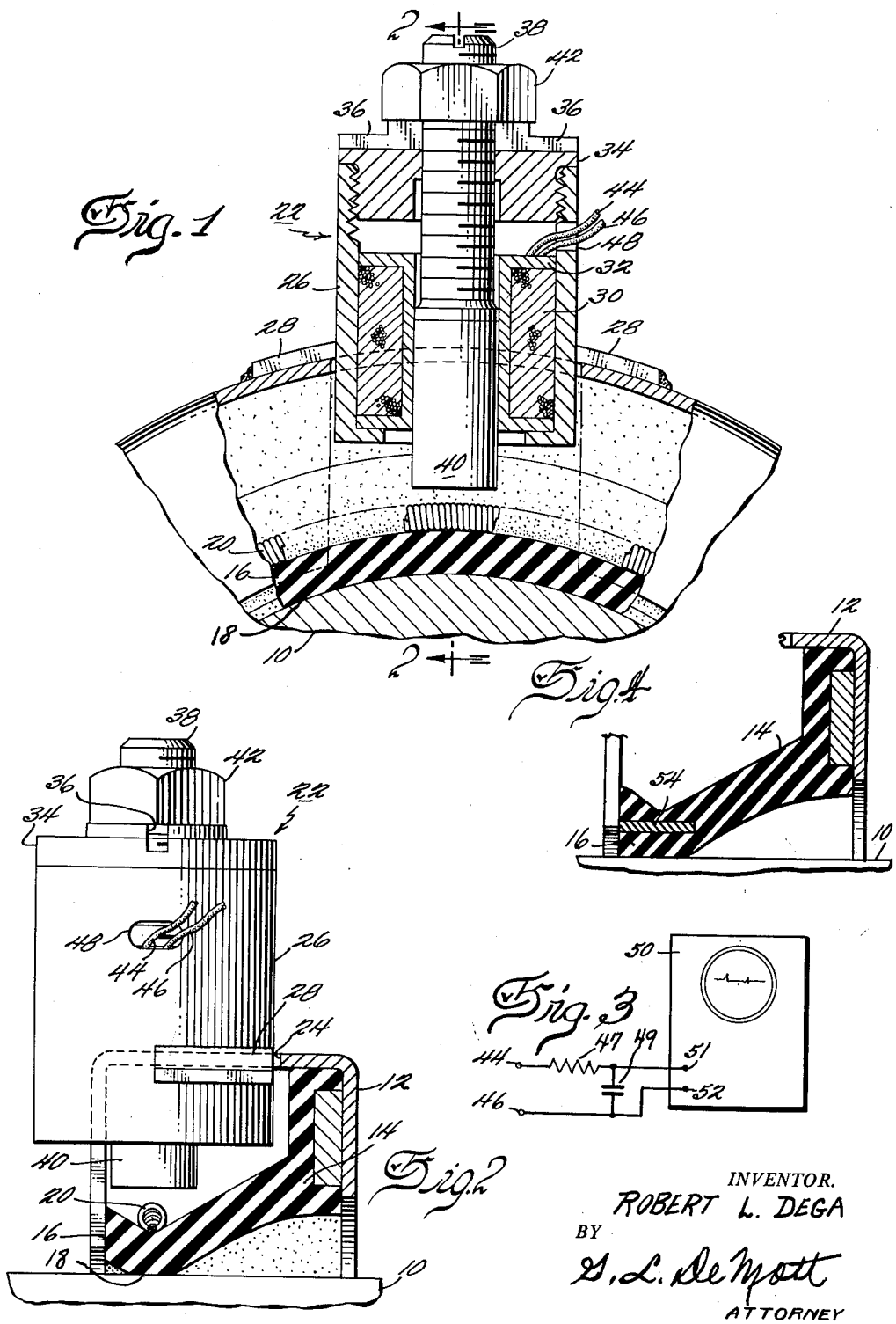
INVENTOR.
ROBERT L. DEGA
BY
G. L. DeMott
ATTORNEY

3,034,043
SEAL LIP INSTRUMENTATION
Robert L. Dega, Utica, Mich., assignor to General Motors Corporation, Detroit, Mich., a corporation of Delaware
Filed May 18, 1959, Ser. No. 814,019
5 Claims. (Cl. 324—34)

This invention relates generally to testing apparatus of the electrical type and more particularly to apparatus for testing the movement of resilient seals normally employed with rotating shafts.

In measuring the oil leak rate in lip type viscous seals, it has been noted that there is some leakage past a relatively tight seal on a very smooth shaft. The only explanation for this leakage is that the lip flutters off the shaft. As the shaft rotates, oil between the seal and the shaft evaporates or is thrown off, increasing friction between the shaft and the seal lip. The increased friction causes the lip to twist with the shaft to a limiting point, then lift off the shaft and return to its normal position allowing oil to leak through. To investigate this theory it was necessary to devise a method and apparatus for detecting any movement of the seal lip during operation.

Existing vibration detecting apparatus employs a probe that is placed in mechanical contact with the specimen under test and so is obviously unsuitable for testing the movement of seals relative to shafts since the mechanical contact impairs the motion which it is desired to measure. Present electrical vibration detectors involve complicated and sensitive apparatus that is not suitable for use in the environment in question.

For example, the seals to be tested may be located in inaccessible positions in various machinery and subjected to an environment of oil, Freon, or other liquid. Also present electrical or optical devices for detecting vibration cannot be conveniently mounted on existing seal housings in their operative positions.

It is therefore a principal object of this invention to provide a means for detecting flutter of a seal lip while the seal is engaging a rotating shaft and to further provide an arrangement whereby the detecting means is mounted on the existing seal housing.

Another object of the present invention is to provide a means for detecting and visually indicating flutter of a seal lip while the seal is engaging a rotating shaft.

A further object is to provide a method for detecting and visually indicating both radial and arcuate movement of a seal lip relative to a rotating shaft.

Lip type viscous seals of the kind under consideration are generally secured to a shaft by a circumferential metallic garter spring. In accordance with the present invention, the above and other objects are attained by mounting a magnetic pickup unit on a seal housing of standard design in such a manner that the pickup unit is in proximity to the seal periphery and adjacent the garter spring. Movement of the seal results in corresponding movement of the conventional magnetic, conductive garter spring surrounding the seal to vary the magnetic field or flux pattern of the pickup. An electric signal proportional to the movement of the seal is obtained from the pickup and is applied to an oscilloscope or other suitable metering means from which a visual indication of seal radial movement or flutter is obtained.

In a modified arrangement of the present invention, a magnetic slug is inserted within the lip or otherwise carried by the seal and circumferential movement of the seal relative to the shaft is determined by movement of the slug within the flux pattern of the magnetic pickup.

The novel features characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a partial elevational view in cross section of the magnetic pickup unit of the present invention taken transverse to the axis of the shaft;

FIGURE 2 is an elevational view partly in cross section taken on the line 2—2 of FIGURE 1;

FIGURE 3 is a schematic diagram of the metering circuit of the present invention; and FIGURE 4 is a partial sectional view of a modified lip type seal employed in the present invention.

Referring now to the drawing, wherein like elements are designated by like reference numerals in all figures, a cylindrical shaft 10 is provided with an annular seal housing 12. Secured within the housing 12 and engaging the shaft 10 is a seal 14 of rubber or other suitable resilient material. Integral lip 16 on the seal 14 bears upon the periphery of shaft 10 along the area 18. A garter spring 20 surrounds the lip 16 to provide a desired pressure between the lip and shaft 10.

The housing 12 which is of standard design is modified to receive the magnetic pickup unit designated generally at 22. A cut-out portion 24 extends across the end and partly down the side of the housing 12 to receive the generally cylindrical shape of the pickup unit 22, so that the pickup unit is suspended adjacent the path of movement of garter spring 20. A cylindrical housing 26 of pickup unit 22 is provided with support members 28 fixedly secured thereto and these support members in turn are welded or soldered to the housing 12 after the pickup unit is inserted in cut-out 24 in its operative position.

In the magnetic pickup unit 22, a pickup coil 30 is wound on an annular coil form 32 that is disposed in the cylindrical housing 26 such that the axis of the coil 30 coincides with the axis of the housing 26. The interior rim of the upper portion of the housing 26 is screw-threaded to receive a cover 34. Slots 36 in the cover 34 allow for the insertion of a tool for tightening cover 34 down on to housing 26. The cover 34 is apertured to receive a threaded shaft 38. Secured to the lower end of shaft 38 by soft solder or other retaining means is a permanent magnet 40 that is preferably a common bar magnet of cylindrical shape and of a length and diameter to fit conveniently within the coil 30. A nut 42 on threaded shaft 38 provides a means for adjusting the position of the magnet with respect to the coil 30 and housing 26 and thus with respect to the garter spring 20. In addition, the nut 42 serves to support the shaft 38 and magnet 40.

The ends of the single conductor of coil 30 terminate in leads 44, 46 which are brought out through the aperture 48 in housing 26. Leads 44, 46 may be connected directly to the vertical input terminals of a standard cathode ray oscilloscope. The vertical amplifiers provided within most commercial oscilloscopes are sufficient to produce an adequate signal on the oscilloscope screen without external amplification between the magnetic pickup unit and the oscilloscope. It may be necessary to add an R-C integrating circuit to the oscilloscope input for the purposes hereinafter set forth. As shown in FIGURE 3, this integrating circuit consists of a series resistor 47 and a shunt capacitor 49 having values selected to integrate a signal in the high audio frequency range such as would be produced by the magnetic pickup unit. These two components may be made up as a simple plug-in unit to be mounted directly on the vertical input terminals 51, 52 of the oscilloscope 50.

In the operation of this detection system, any radial movement of the garter spring 30 will disturb the flux pattern existing between one pole at the lower end of magnet 40 and the other pole at the upper end. It will be noted that the flux pattern encloses all or a major part of the turns of coil 30, so that any change in the flux pattern induces current flow in coil 30 and produces a voltage across leads 44, 46. This voltage results in a vertical deflection on the oscilloscope screen that is proportional to the velocity of the radial movement of the garter spring, with respect to the shaft. By using the integrating circuit 51, 52 between the pickup 22 and the oscilloscope 50, as set forth above, a vertical deflection representing space displacement of the garter spring may be obtained. By synchronizing the horizontal sweep of the oscilloscope with the speed of rotation of shaft 10 by some external means, a trace of one sweep for each revolution of the shaft is produced.

It is also desirable to detect and measure the circumferential movement of the seal lip that results when the lip twists with the shaft then springs back to its original position by lifting off the shaft.

Referring now to FIGURE 4, a small piece or slug 54 of ferrous material is secured within the seal lip and in a position normally adjacent the magnetic pickup unit 22. The ferrous slug which is preferably a small rod-like member is positioned generally parallel to the shaft 10 and perpendicular to the axis of the magnet 40 of the magnetic pickup unit. Arcuate movement of the lip 16 causes the ferrous element to move through the magnetic flux pattern of the pickup unit 22 and produce a signal in the same manner as described above.

What I claim as my invention is:

1. Electrical apparatus for determining the magnitude of movement of a garter spring on a seal lip while said seal lip is operatively engaging a rotating shaft comprising a permanent magnet mounted in close proximity to the garter spring such that movement of the garter spring disturbs the flux pattern of the permanent magnet, a pickup coil located in the flux pattern of the permanent magnet for producing an electrical signal representative of the velocity of movement of said garter spring, an integrating circuit connected to said coil for converting said signal into a voltage representative of space displacement of the garter spring, and an oscilloscope coupled to said integrating circuit for visually indicating the magnitude of said voltage.

2. A method of obtaining a visual indication representing the magnitude of arcuate movement of a seal lip while the seal lip is engaging a rotating shaft comprising the steps of securing a ferrous element on the seal lip, positioning a magnetic pickup unit in close proximity to the ferrous element, obtaining an electrical signal from the magnetic pickup unit that represents the velocity of movement of the ferrous element, integrating the electrical signal to obtain a second electrical signal that represents space displacement of the ferrous element, and feeding the second electrical signal to the input of a cathode ray oscilloscope to obtain a visual representation of the displacement of the ferrous element and the seal lip.

3. A method of obtaining a visual indication representative of the magnitude of displacement of a seal lip while the seal is engaging a rotating shaft comprising the steps of securing a ferrous element on said seal lip, mounting a magnetic pickup unit in the housing of said seal whereby said pickup unit is in close proximity to said ferrous element and responsive to the velocity of displacement thereof, deriving an electrical signal from the pickup unit that represents said velocity of displacement, integrating said electrical signal to produce a second electrical signal that represents displacement of said ferrous element, and coupling said second electrical signal to the input of a visual indicating device for producing a visual indication of said displacement as a function of time.

4. Apparatus for providing a visual indication of the magnitude of displacement of a seal lip while the seal lip is engaging a rotating shaft comprising a ferrous element mounted on said seal lip, a magnetic pickup unit positioned in close proximity to said ferrous element and adapted to produce an output signal related to the velocity of movement of said ferrous element with respect thereto, an integrating circuit having an input and an output, said input being connected to said magnetic pickup unit to receive said signal, said integrating circuit being adapted to integrate said signal to provide an output signal related to the displacement of said ferrous element, and visual indicating means connected to said output of said integrating circuit to receive said output signal and adapted to provide a visual indication of the magnitude thereof as a function of time.

5. Apparatus for providing a visual indication of the magnitude of flutter of the seal lip and garter spring of a lip-type viscous seal while said seal is engaging a rotating shaft comprising a magnetic pickup assembly adapted to be mounted in a seal housing which encloses said seal, a permanent magnet included in said pickup assembly and positioned in close proximity to said garter spring, means for adjusting the position of said permanent magnet with respect to said garter spring, a pickup coil included in said pickup assembly and surrounding said permanent magnet to be responsive to the flux pattern produced thereby, said pickup coil producing an output signal related to the velocity of movement of said garter spring with respect to said permanent magnet, an integrating circuit having an input and an output, said input being connected to said pickup coil to receive said output signal, said integrating circuit being adapted to integrate said output signal to provide an output voltage related to the displacement of said garter spring, and visual indicating means connected to said output of said integrating circuit to receive said output voltage and adapted to provide a visual indication of the magnitude thereof as a function of time.

References Cited in the file of this patent

UNITED STATES PATENTS

| | | |
|---|---|---|
| 1,640,464 | Mershon | Aug. 30, 1927 |
| 2,251,436 | Bentley et al. | Aug. 5, 1941 |
| 2,275,675 | Draper | Mar. 10, 1942 |
| 2,340,609 | Mestas | Feb. 1, 1944 |
| 2,503,721 | Angell | Apr. 11, 1950 |
| 2,506,433 | Plesset | May 2, 1950 |
| 2,575,710 | Hardigg | Nov. 20, 1951 |
| 2,665,333 | Dunipace et al. | Jan. 5, 1954 |